(12) United States Patent
Malhomme

(10) Patent No.: US 7,391,340 B2
(45) Date of Patent: Jun. 24, 2008

(54) PORTABLE HELICOPTER LANDING AREA AND USE METHOD THEREOF

(76) Inventor: Luc Malhomme, Moulin de la Ribeyre, 43410 Lempdes sur Allagnon (FR)

( * ) Notice: Subject to any disclaimer, the term of this patent is extended or adjusted under 35 U.S.C. 154(b) by 177 days.

(21) Appl. No.: 10/541,151

(22) PCT Filed: Dec. 23, 2003

(86) PCT No.: PCT/FR03/03879

§ 371 (c)(1),
(2), (4) Date: Feb. 10, 2006

(87) PCT Pub. No.: WO2004/060745

PCT Pub. Date: Jul. 22, 2004

(65) Prior Publication Data

US 2006/0170568 A1 Aug. 3, 2006

(30) Foreign Application Priority Data

Dec. 30, 2002 (FR) .................................. 02 16840

(51) Int. Cl.
*G08G 5/00* (2006.01)
(52) U.S. Cl. .................. 340/947; 340/950; 340/981; 244/110 E; 244/114 R; 244/116
(58) Field of Classification Search ................. 340/981, 340/947, 950; 244/110 E, 114 R, 116
See application file for complete search history.

(56) References Cited

U.S. PATENT DOCUMENTS

| | | | |
|---|---|---|---|
| 3,589,183 A | 6/1971 | Ledford | |
| 5,559,510 A | 9/1996 | Strong et al. | |
| 5,577,687 A * | 11/1996 | Downing | ................ 244/110 E |
| 5,832,867 A | 11/1998 | Whicker, Jr. | |
| 6,079,668 A * | 6/2000 | Brown | .................... 244/114 R |
| 6,329,933 B1 | 12/2001 | Mikesic | |

(Continued)

FOREIGN PATENT DOCUMENTS

EP 1 197 437 A 4/2002

(Continued)

*Primary Examiner*—Benjamin C. Lee
*Assistant Examiner*—Samuel J. Walk
(74) *Attorney, Agent, or Firm*—Clark & Brody

(57) ABSTRACT

The invention relates to a portable helicopter landing area and to the use method thereof. The inventive device comprises two cases (1, 2) which can be carried by the person on the ground (X) and which are intended to be disposed on the selected surface or area (H). Moreover, two units (A, B) can be removed from the aforementioned two cases respectively. The visual positioning unit (A) comprises: a light which produces four successive white flashes (7) and which is visible from a distance of at least forty kilometers by an aircraft pilot, and a high-frequency current generator unit. The lighting unit (B) comprises: (i) at least five marker lights (16*a* to 16*e*) which are disposed in the form of a Y on the ground, thereby creating five white points on the ground which turn blue when the pilot reaches the vertical above the selected landing area or surface (H); and (ii) a kit for the assembly of an illuminated wind cone which provides information relating to the wind at the aforementioned selected landing area or surface (H). The invention is suitable for emergency operations requiring the intervention of at least one airborne team and, in particular, a heliborne team.

27 Claims, 9 Drawing Sheets

Figure 1:
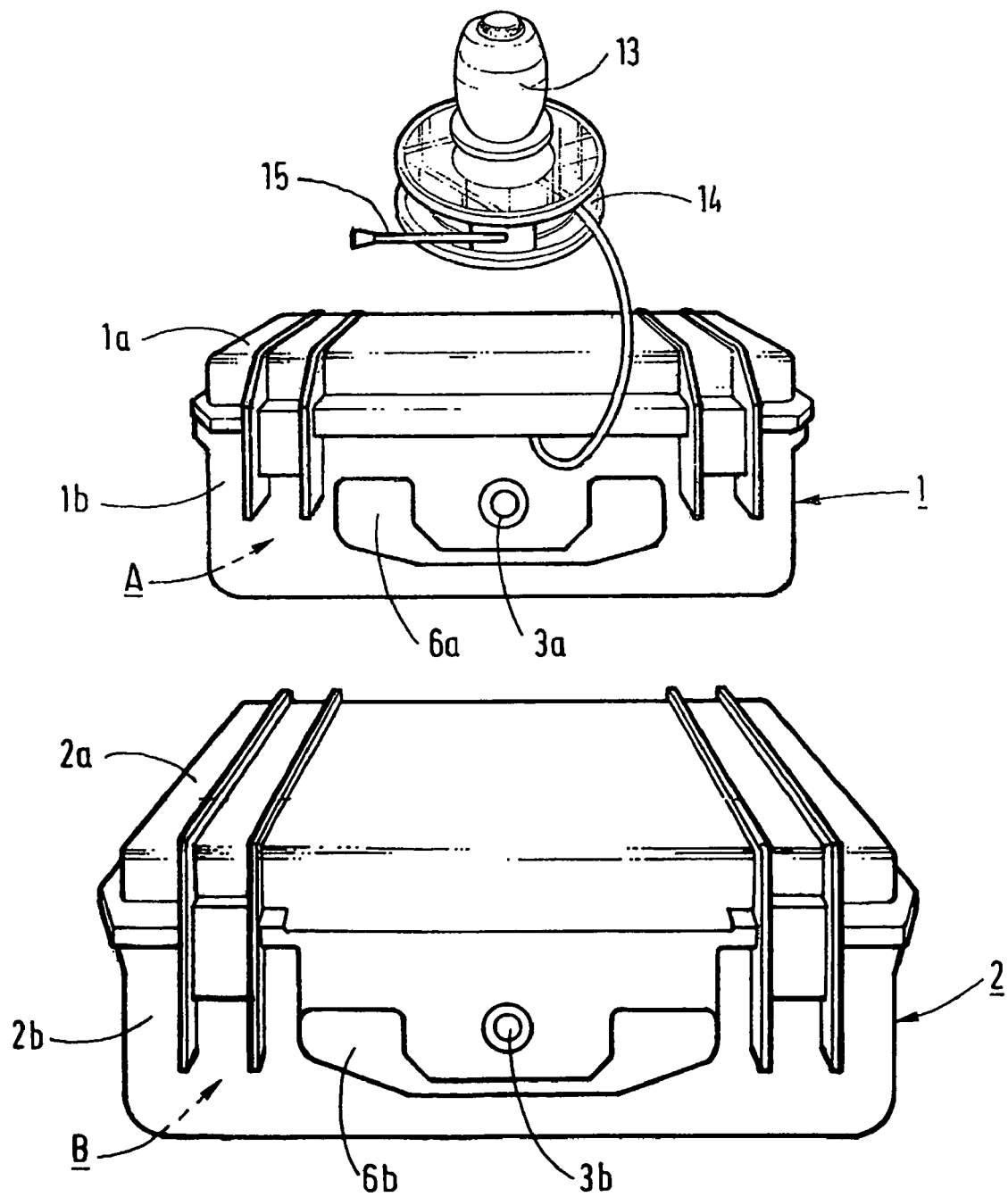

U.S. PATENT DOCUMENTS 6,567,248 B1 * 5/2003 Schmidt et al. ............. 340/982
6,808,291 B1 * 10/2004 Aylward et al. ............. 362/205

FOREIGN PATENT DOCUMENTS

| JP | 10067399 | 3/1998 |
| JP | 2000280995 | 10/2000 |
| WO | WO 98/41448 | 9/1998 |

* cited by examiner

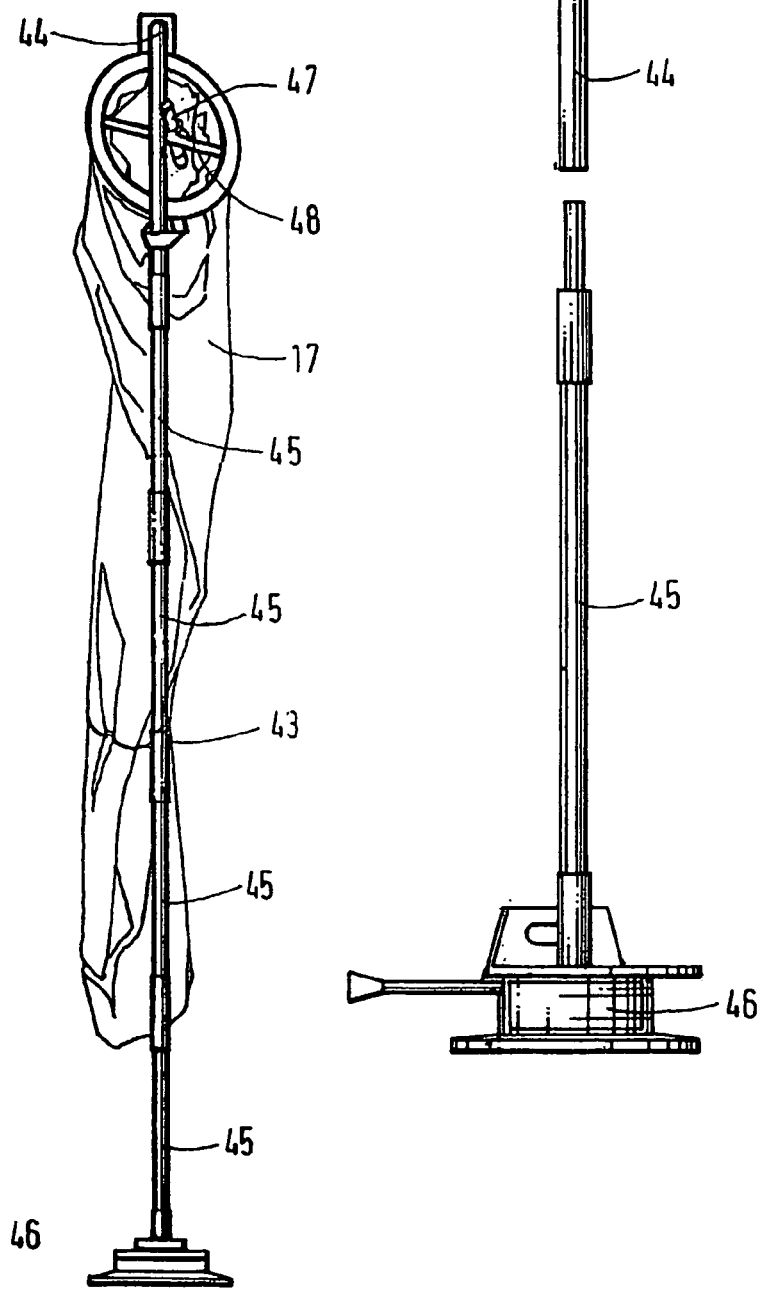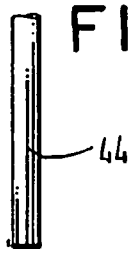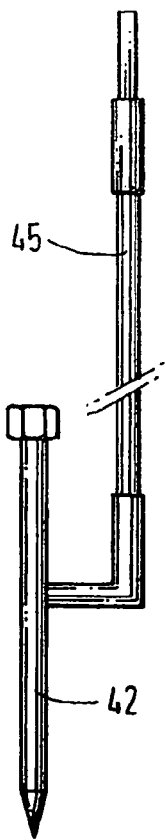

PORTABLE HELICOPTER LANDING AREA AND USE METHOD THEREOF

This application is the national stage of International Application Number PCT/FR03/03879, filed Dec. 23, 2003, which was published in French, and claims priority of France Application Number 02/16840, filed Dec. 30, 2002.

The present invention relates to a method and a device which may be used in particular for locating and beaconing any chosen touchdown surface or area for an intervention at night or in bad weather of at least one airborne and in particular heliborne team carrying out in particular one or more rescue operations. This team cooperates with at least one person intervening on the ground furnished with said device and positional on said chosen touchdown surface or area, so as to allow the fast and safe landing and/or takeoff of all types of aircraft and in particular of helicopters, transporting said airborne and in particular heliborne team or teams.

The invention allows in particular the rapid intervention of airborne and in particular heliborne teams, allowing them, after having been placed in contact with said at least one person intervening on the ground furnished with the device in accordance with the invention whose rapid setup he/she ensures, to intervene on said chosen touchdown surface or area while being assured of safe guidance, of reliable landing and takeoff on said chosen touchdown surface or area.

Hitherto, aircraft, and in particular helicopters for rescue, have been unable to intervene at night or in bad weather.

For example, in case of a road accident, when the emergency rescue people intervene with regard to the injured, the emergency services reckon that the chances of survival of an injured person suffering from respiratory insufficiency are better than eighty percent if they intervene with regard to the injured person within the thirty minutes which follow the accident so as to ensure oxygenation of the brain which is essential to survival. After forty minutes following the accident, the chances of survival are less than thirty-five percent, after fifty minutes, they drop below ten percent and an hour after the accident, any rescue is, in theory, now useless.

These tragic statistics have therefore led most emergency services to use a helicopter by day since it alone makes it possible to reach in less than ten minutes the touchdown surface or area required within the average geographical limits of a regional authority.

Although, by day, rescue helicopters save numerous lives by intervening directly at accident sites, at night, by contrast, helicopters travel only from a hospital equipped with a fixed luminous beaconing to another hospital likewise beaconed to ensure transfer of the injured. However, they may not therefore intervene at night directly on accident sites for obvious safety reasons whereas it is noted that it is precisely at night that more than a third of the most serious accidents occur.

European statistics show that every second heart attack and more than half the cases of apoplexy occur between 8 p.m. and 6 a.m., numerous lives are therefore sacrificed in the absence of a technical solution to the problem posed.

In fact, at night when flying by sight, the approach, landing and/or takeoff by helicopter on or from a given area or surface called a helisurface, are left to the assessment and to the responsibility of the onboard commanding pilot. This type of night campaign maneuver presents enormous risks of accident.

Accurate visualization of the point of touchdown and/or of the obstacles on the approach slope and/or departure slope, the force and the direction of the wind over the given surface is impossible without luminous beaconing, or windsock.

Experience has proven that helicopter landings with the aid of ground vehicle headlights for illuminating the area of intervention have cost the loss of more lives than they have saved.

The method and the device for the implementation of this method in accordance with the present invention remedy these drawbacks by allowing fast and safe setup of a unit for visual locating and beaconing on the chosen touchdown surface or area, with a view to locating and beaconing said chosen touchdown surface or area so as to allow the intervention of airborne and in particular heliborne teams. More particularly, the invention is directed at fast and reliable landing and/or takeoff at night or in bad weather, of all types of aircraft and in particular of helicopters, transporting said airborne and in particular heliborne team or teams.

Therefore, the present invention offers the possibility of touching a helicopter down, at night or in bad weather, on an accident site so as to allow the rapid intervention of rescue teams and the immediate transfer of the injured to the nearest hospitals. It is therefore henceforth possible, for example, to pre-equip nonbeaconed hospitals and ground rescue intervention vehicles with a lightweight, compact, integral device that can be carried by a single man, that can run autonomously for at least 12 hours, so as to make it possible to resolve the technical problems set forth hereinabove with a view to using the helicopter at night as well as by day.

The present invention applies equally to numerous fields other than that of emergency rescue. For example, it could involve the rapid intervention of the forces of order in rural or urban settings should a hostage be taken at night. It is also possible to envisage the use of a fleet of helicopters in the case of a "Catastrophe Plan" after, for example, an explosion at a chemicals facility in an urban zone and at night. The use of the device in accordance with the present invention would moreover make it possible to comply with the new regulations in force compelling each French regional capital to make provision for the mass arrival of injured people at hospitals.

More precisely, the present invention relates to a method and a device for locating and beaconing any chosen touchdown surface or area for an intervention at night or in bad weather of at least one airborne and in particular heliborne team carrying out in particular one or more rescue operations, cooperating with at least one person intervening on the ground positional on said chosen touchdown surface or area, so as to allow the fast and safe landing and/or takeoff of all types of aircraft and in particular of helicopters, transporting said airborne and in particular heliborne team or teams.

The method in accordance with the invention allows said airborne and in particular heliborne team, after deployment, setup and lighting of an item of hardware by said at least one person intervening on the ground, to pinpoint, locate, approach and overfly any chosen touchdown surface or area, by visual location and energy-autonomous beaconing causing a luminous change from the aircraft when it passes vertically above this beaconing, so as to land and/or to take off again in complete reliability on the touchdown area.

The implementation device in accordance with the invention comprises two leaktight housings, that can be easily carried by said at least one person intervening on the ground and are intended to be disposed on said chosen touchdown surface or area, the interior volume of said housings being intended to accommodate, retain and allow the extraction with complete reliability of the hardware constituting said device necessary for said intervention with a view to its fast and effective mounting, said hardware consisting of two units disposed respectively in each of said housings, namely:

a first so-called visual locating unit, for said chosen touchdown surface or area comprising at least one lamp with successive white flashes, linked to a high frequency current generator box, said first unit being, after setup, visible in flight from a distance of greater than forty kilometers by the pilot of the aircraft and in particular of the helicopter transporting said airborne and in particular heliborne intervention team or teams, a second so-called beaconing unit, for said chosen touchdown surface or area for said airborne and in particular heliborne team or teams, comprising at least five independent luminous beacons, each beacon being autonomous in terms of electrical energy and furnished with an optical cone concentrating at least two light beams along two nonsecant angular intervals, a first interval rising from the ground and a second interval concentrated around a so-called vertical axis perpendicular to the ground, and elements of a kit allowing instantaneous mounting of a complete windsock and of its autonomous lighting system, said second unit ensuring, after setup, a beaconing of said chosen touchdown surface or area, compatible with any difficult vision system and in particular night vision goggles.

The leaktight housings take the form of briefcases made of polypropylene copolymer resin and are equipped with snap-fit fast open and close devices and furnished with depressurization valves.

The weight of the first housing does not exceed ten kilograms and its bulk is reduced so as to be able to be transported with the aid of a carrying handle by a single person.

The interior of said first housing is clad with a cellular padding made of plastazote or any other appropriate material in which are fashioned compartmentalization cells, making it possible to accommodate, to retain in a reliable manner and to rapidly withdraw the hardware constituting said first visual locating unit.

Said first visual locating unit, accommodated in said first housing, consists of a module of lithium electric batteries of thirty-five amperes, of a high frequency current generator box, of a light with four successive flashes, of a system for turning on and off by remote control, of a manual on/off control button, of wiring and of couplings for fast electrical connection linking these various elements together.

The light with four successive flashes is a light with four successive white flashes of very high power, mounted on a mechanical sucker, or on any other appropriate support, allowing its instantaneous fitting to the top of the housing reclosed after the removal of said light. It is supplied by said module of lithium electric batteries allowing its continuous use for more than twelve hours.

As a variant, a cigar lighter socket of a ground vehicle providing electrical current of a voltage of twelve volts or of twenty-four volts, or a second module of backup energy lithium electric batteries is provided for supplying the high frequency current generator box.

Said first housing is intended to be set up at least one hundred meters upstream of said chosen touchdown surface or area so as not to impede the pilot of an aircraft and in particular a helicopter transporting said airborne and in particular heliborne team or teams, in the last phase of the landing. It is intentionally separated from the beaconing unit so as to be able to be set up, for example, on the crest of a plateau although the rescue takes place at the bottom of a valley. This allows the pilot of an aircraft and in particular of a helicopter transporting said airborne and in particular heliborne team or teams, to approach the rescue site while overflying the plateau heading for the light with four successive white flashes and to discover said chosen touchdown surface or area duly beaconed in the valley after passing vertically above said light with four successive white flashes.

Said second beaconing unit accommodated in said second leaktight housing does not exceed a weight of twenty kilograms and its bulk is such that it can be carried in one hand by a single person.

Said second housing is furnished, like the first housing, with a snap-fit fast open and close device and with a depressurization valve.

Said second housing comprises a bottom clad with a cellular padding with two stages made of plastazote or any other suitable material, in which are fashioned compartmentalization cells, making it possible to accommodate, to retain in a reliable manner and to rapidly extract the hardware constituting the second so-called beaconing unit for said chosen touchdown surface or area for the intervention of said airborne and in particular heliborne team or teams.

Said second so-called beaconing unit comprises at least five independent beacons that are autonomous in terms of electrical energy and are intended to generate at least five fixed luminous points on the ground after setup thereof.

The body of said beacons encloses a box of ten electric batteries of standard type (AA), its shape, in the lower conical part, is devised so as to return a part of the light downward in order to create a halo of light on the ground giving the pilot a horizontal plane effect, and its height is such that it makes it possible to fashion a lighting zone situated above the foliage or other natural obstacles on the ground.

A receiver box for the radio transmissions of the remote control is inserted inside the body of said beacons so as to allow said at least one person intervening on the ground to remotely turn on or turn off said beacons and to modify the lighting intensity thereof, without moving and without entering the safety zone of ground deployment of the aircraft and in particular of the helicopter, with the aid of a remote control contained in said second housing.

As a variant, a receiver could be controlled directly by the pilot of the aircraft and in particular of the helicopter, transporting said airborne and in particular heliborne team or teams, by virtue of the radio thereof.

The lighting generated by said beacons is a light termed "cold light" obtained with the aid of LED diodes generating a light of high intensity while benefiting from extremely reduced consumption thus making it possible to ensure a lighting of more than twelve hours at full power.

The electronic circuit supporting the LED diodes is designed in such a way as to be able to use the beacons either with the naked eye, or with night vision goggles, or under infrared for military applications.

The light emitted by said beacons is a white light emitted at an angle between zero degrees of horizontal reference and plus thirty-five degrees in the vertical plane, which represents the angle at which an aircraft and in particular a helicopter, arrives from far away.

A set of optical cones concentrates a ray of blue light upward at an angle of thirty-five degrees about the vertical axis of said beacons, thus allowing at least one pilot of an aircraft and in particular a helicopter, transporting said airborne and in particular heliborne team or teams, to approach a Y consisting of five white points which become blue when his aircraft and in particular his helicopter passes vertically above said Y, this change of color from white to blue confirming to the pilot of the aircraft and in particular of the helicopter that he is indeed above said chosen touchdown surface or area which has been prepared for him by said at least one person intervening on the ground.

This disposition also allows said pilot to determine immediately, during his vertical passage, the axis and the direction of approach of safety which were previously defined by said at least one person intervening on the ground after the latter has ensured the absence of surrounding obstacles and has taken account of the wind information regarding the chosen touchdown surface or area, these two operations necessarily being performed before the setting up of said device.

The remote control and/or manual control of said beacons makes it possible to obtain various levels of lighting power as a function of the night vision equipment of the pilot and of the night levels encountered during the approach.

With the remote control, the changing of these various levels is obtained by simple presses exerted on the button provided for this purpose or, as a variant, by the radio of the aircraft and in particular of the helicopter.

With the manual safety control, the changing of these various levels is obtained by manually actuating a button situated on the body of each beacon.

Said beacons are leaktight against rain and against dust caused by the blast from an aircraft and in particular a helicopter.

Said second unit also comprises in the form of a kit, contained in said second housing, a windsock furnished with an autonomous lighting system and a collapsible mast allowing its fast setup so as to give the pilot of the aircraft and in particular of the helicopter the wind information regarding said chosen touchdown surface or area.

Said mast consists of cylindrical sections or tubes made of carbon fiber that can be very rapidly collapsed, that is resistant to blast without any risk of being blown away and of going, for example, into the blades of an aircraft and hoists, after mounting, said windsock more than 4 meters above the ground.

As a variant, said mast may also be fixed to a stainless steel spike driven into the ground in the case of absence of any vehicle on said chosen touchdown surface or area. As a variant, said mast may be fixed on any available vehicle with the aid of a mechanical sucker designed for this purpose.

Said windsock is illuminated in an autonomous manner with the aid of a leaktight autonomous lamp consisting of a group of LED lamps for ensuring it autonomous lighting of more than twelve hours of white light termed "cold light".

Figure 2:
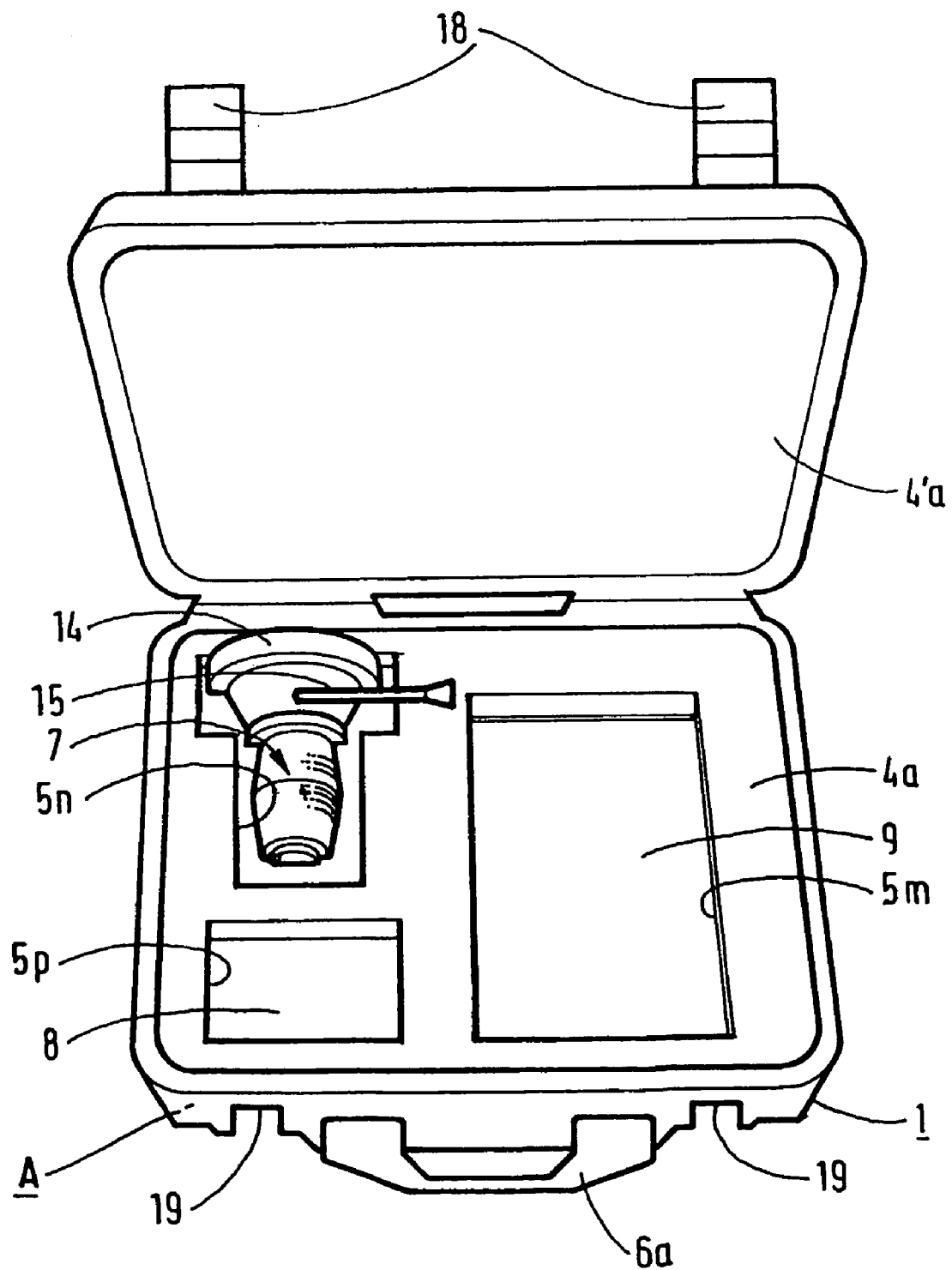
Figure 3:
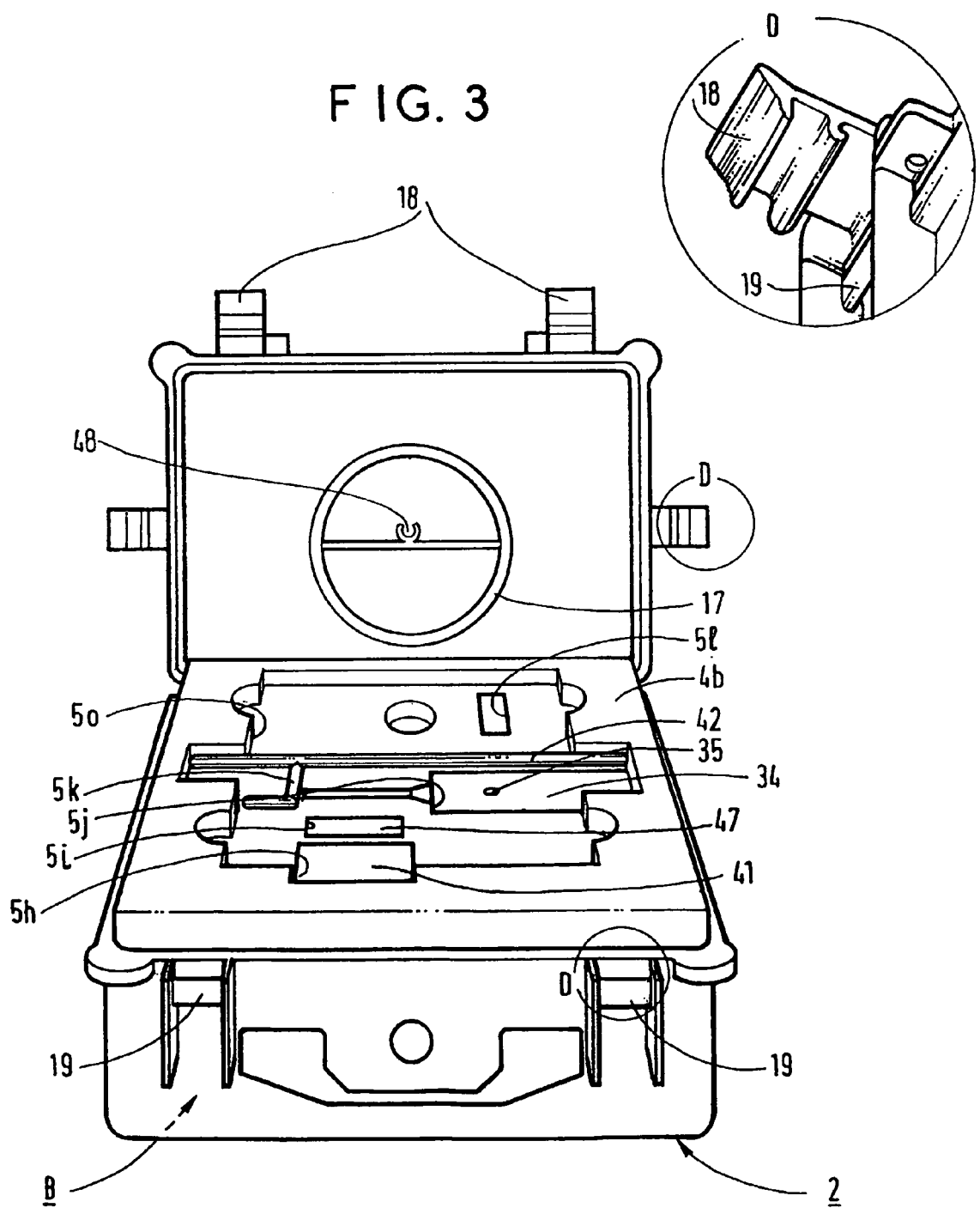
Figure 4:
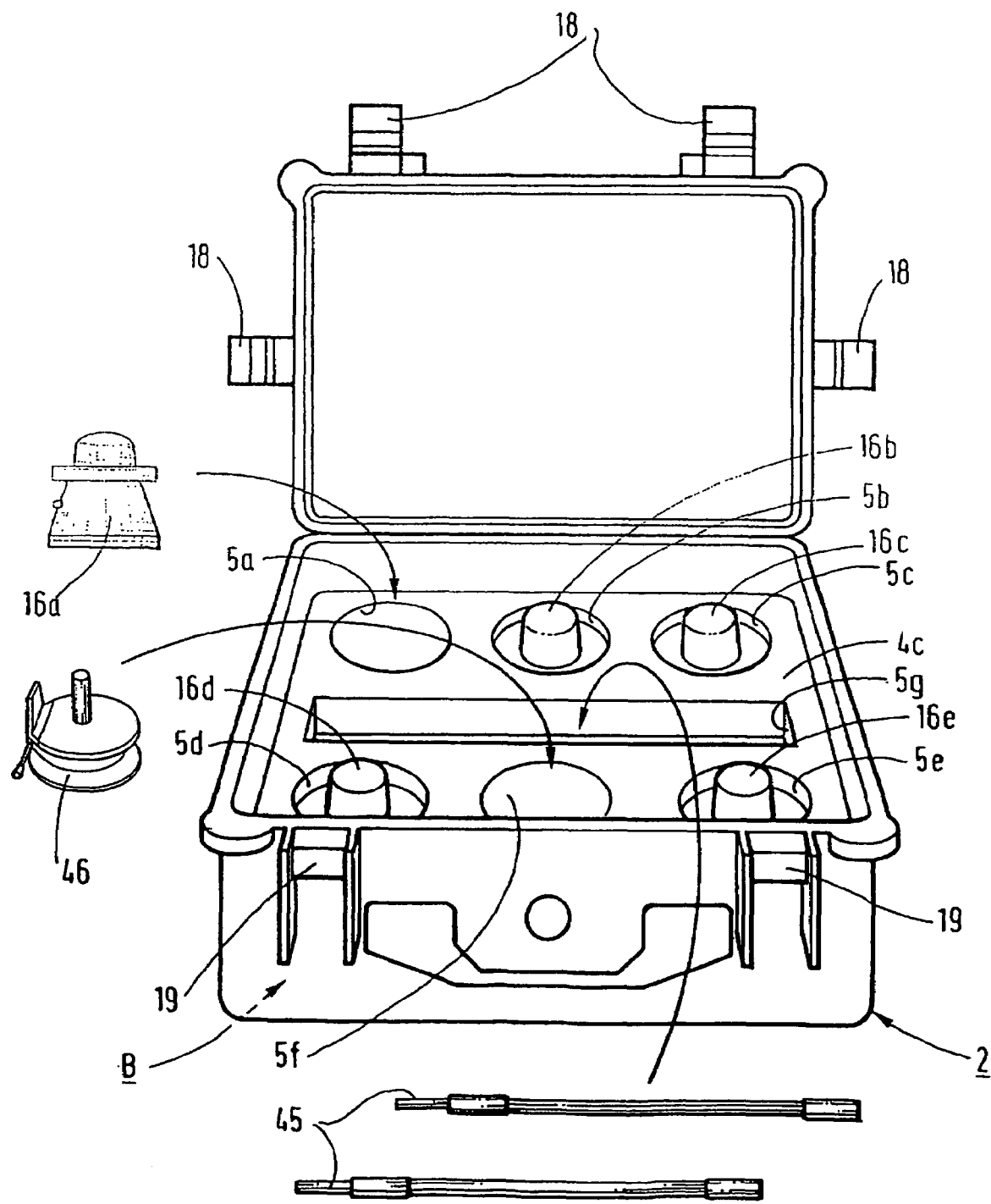
Figure 5:
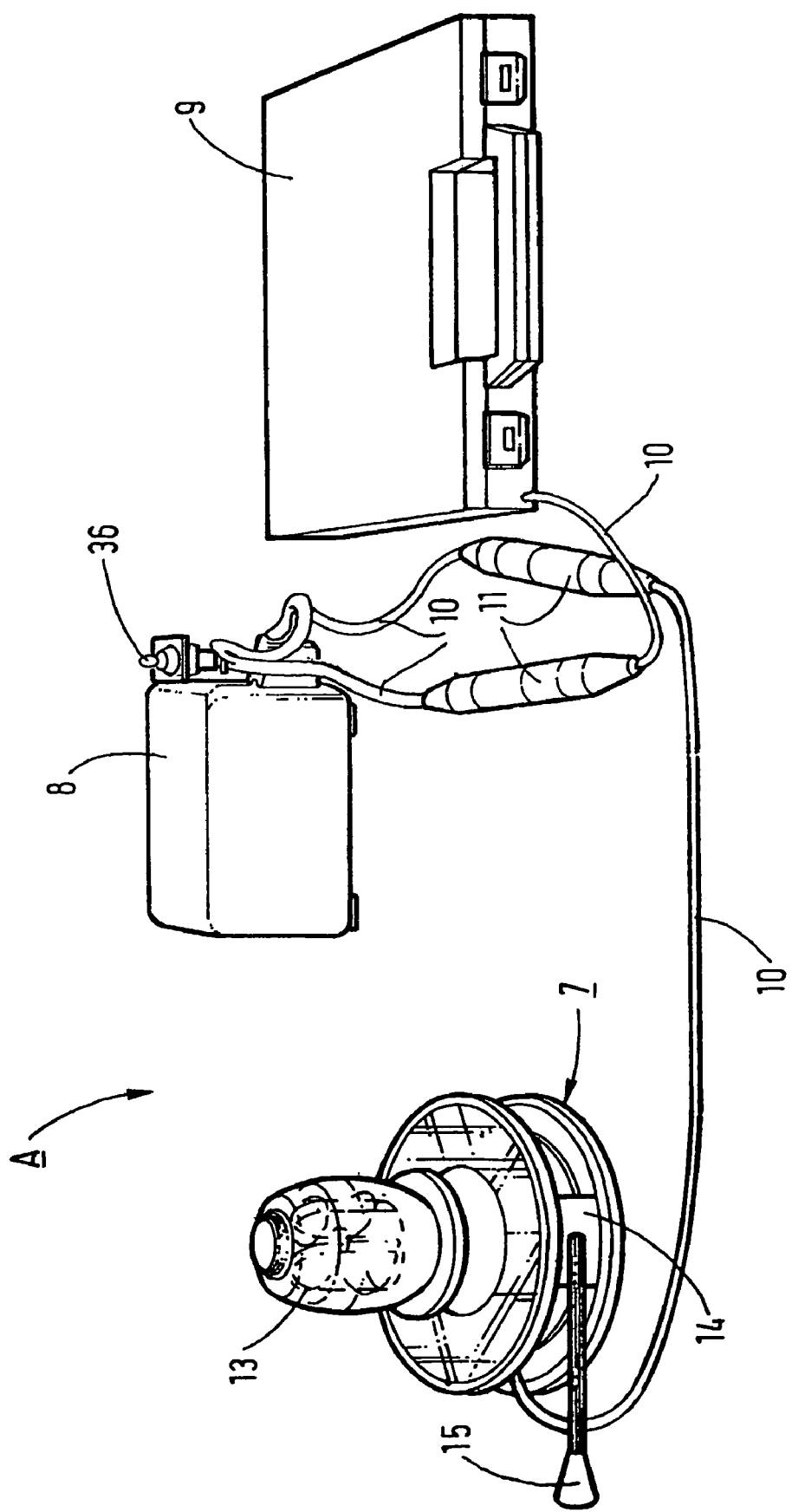
Figure 6:
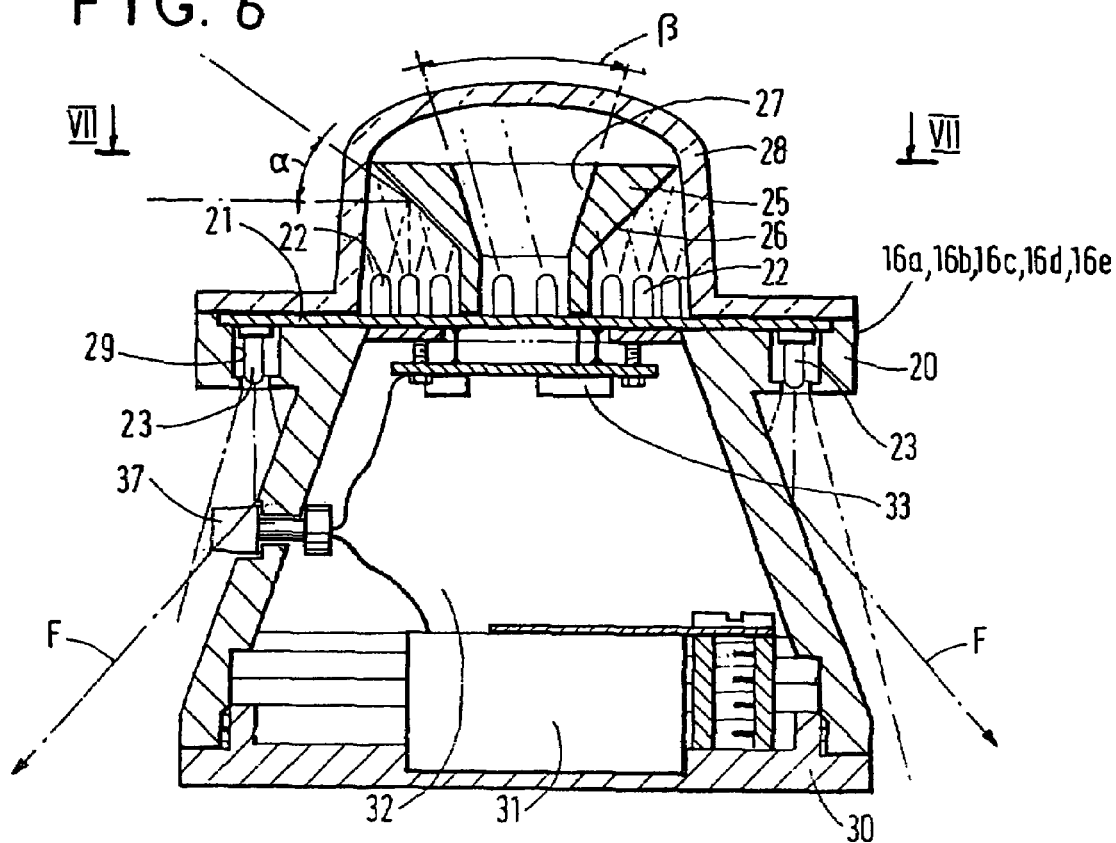
Figure 7:
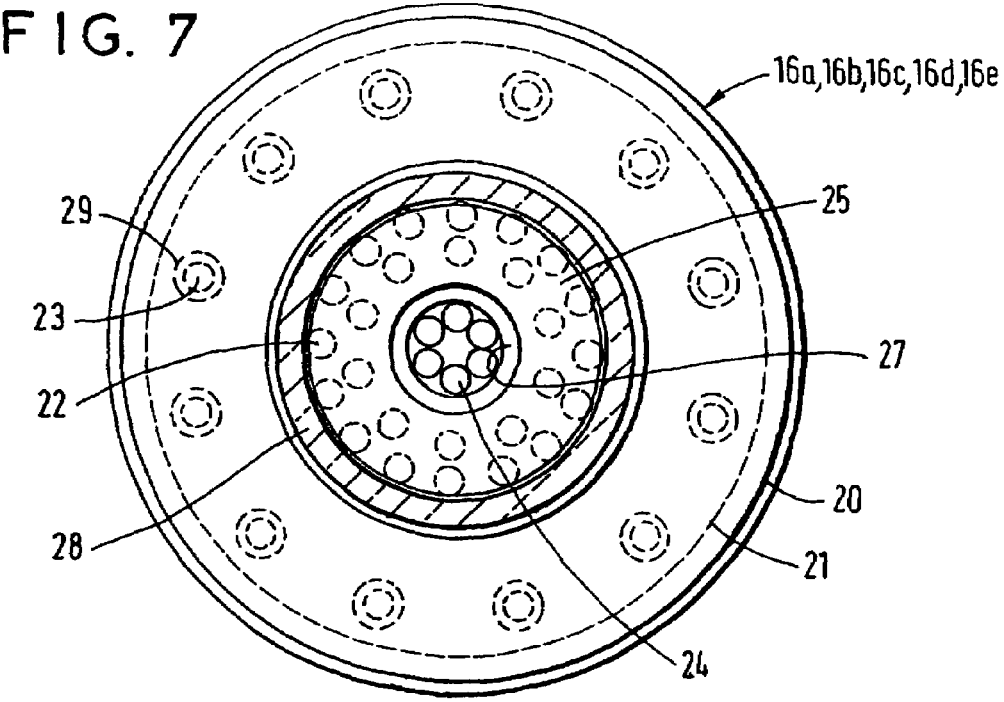
Figure 8D:
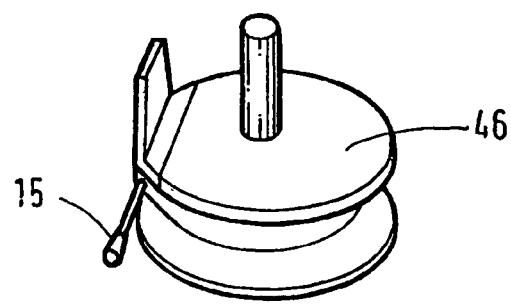
Figure 8E:
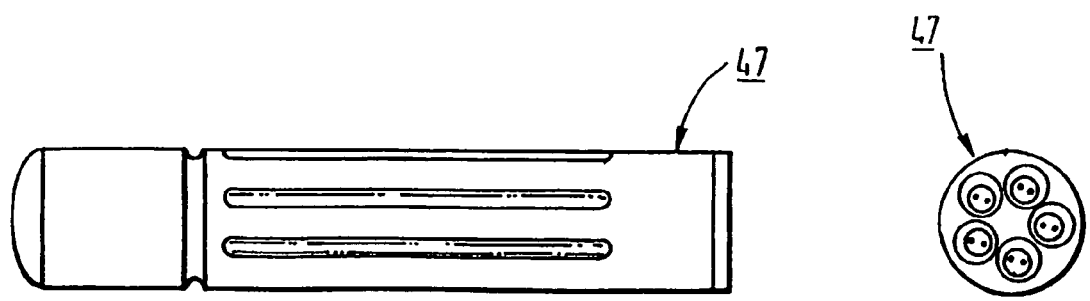
Figure 9:
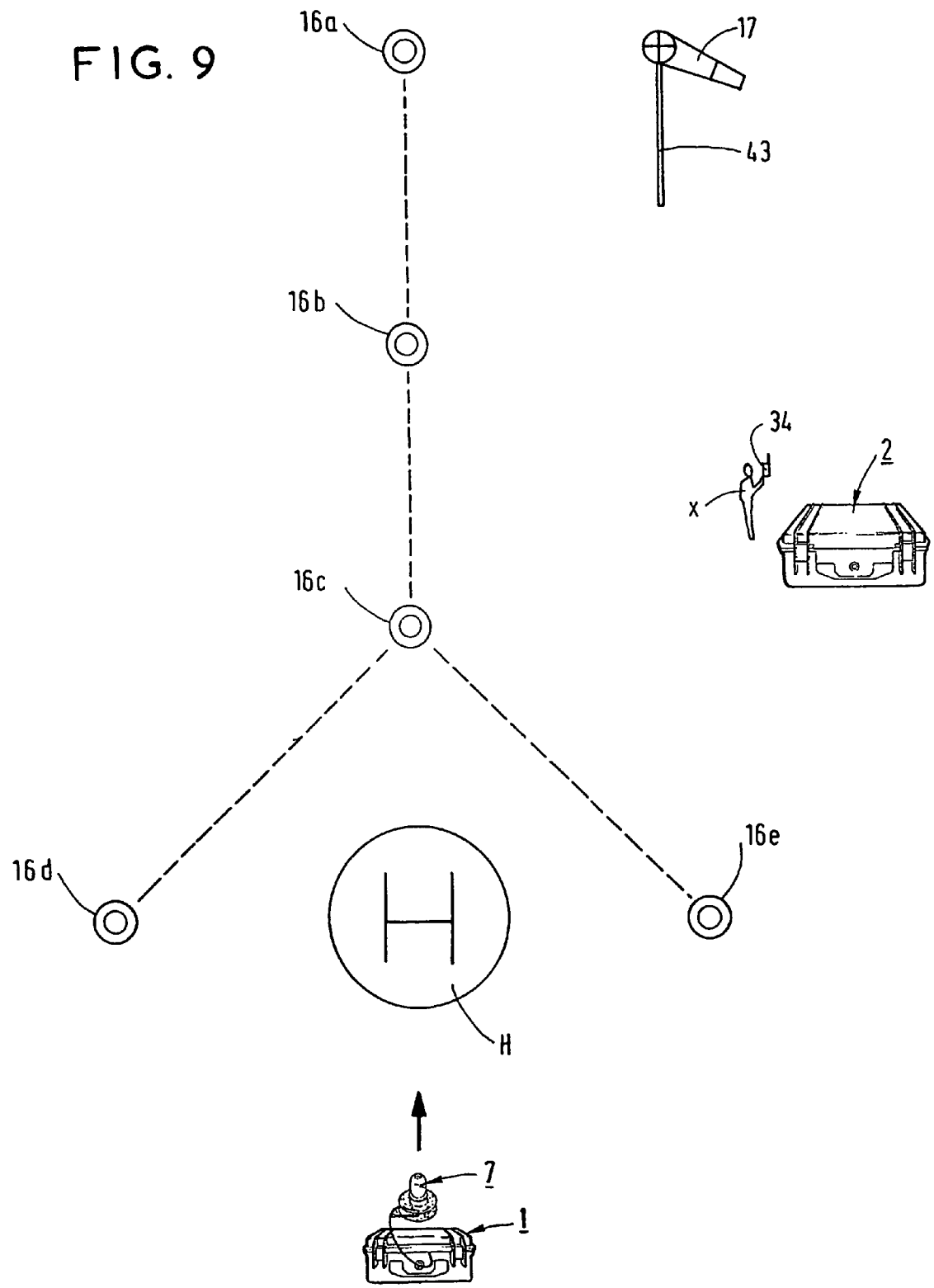

Other characteristics of the invention will become apparent in the course of the detailed description which follows with reference to the appended figures which represent respectively:

FIG. 1, a perspective view of the two housings containing respectively said first and second units for visual locating and beaconing. The first and the second housing are represented closed, the light with four successive flashes contained inside the first housing being represented outside so as to illustrate its mechanical fixing sucker;

FIG. 2, a perspective view of the first housing open showing the disposition of the elements constituting the first visual locating unit, namely the light with four successive white flashes, the high frequency current generator box and the module of lithium electric batteries supplying said box;

FIG. 3, a perspective view of the second housing, the latter being represented open so as to show, in their compartmentalization cell, the elements contained in the upper stage of the cellular padding namely the windsock, the box of the portable GPS receiver, the lamp of the windsock, the remote control of the five beacons, the stainless steel spike for fixing the mast of the windsock to the ground and the front lamp of the ground operator;

FIG. 4, a perspective view of the second housing, the latter being represented open so as to show, in their pocket, the elements contained in the lower stage of the padding, namely, the five beacons, the sucker of the mast of the windsock and the tubes of the mast of the windsock;

FIG. 5, a detailed perspective view of the elements constituting the visual locating unit (A) contained in the first housing;

FIGS. 6 and 7, respectively sectional and plan views of one of said luminous beacons in accordance with the invention, contained in the second housing containing the beaconing unit illustrating moreover the various zones of projection of the various light beams emitted by said beacon;

FIGS. 8*a* to 8*e*, perspective views of the various constituent elements of the kit of the windsock, including of the assembled windsock, of the mechanical sucker, of the stainless steel spike and of the autonomous lamp; and FIG. 9, a diagrammatic view of the principle of ground disposition of the device illustrating the chosen touchdown surface or area duly located and beaconed with the aid of the device in accordance with the invention.

The device in accordance with the present invention is essentially intended, as was indicated in the introduction of the present patent application, for locating and beaconing any chosen touchdown surface or area (H) for at least one intervention, at night or in bad weather, of at least one airborne and in particular heliborne team, carrying out in particular one or more rescue operations, cooperating with at least one person intervening on the ground (x) furnished with said device and positional on said chosen touchdown surface or area (H), so as to allow the fast and safe landing and/or takeoff of all types of aircraft and in particular of helicopters, transporting said airborne and in particular heliborne team or teams.

As shown in FIG. 1, the device in accordance with the invention is essentially constituted by two housings 1 and 2 exhibiting the form of leaktight briefcases, made of polypropylene copolymer resin, and intended to contain the visual locating unit A and moreover the beaconing unit B.

These two housings or briefcases 1 and 2 hereinafter dubbed housings or briefcases are furnished with carrying handles 6*a* and 6*b* and can be transported by a single person. Pressurization valves 3*a* and 3*b* make it possible to balance the internal pressure of the briefcase with the external atmospheric pressure so as to allow their opening despite daily variations in atmospheric pressure.

The two housings 1 and 2 are equipped with snap-fit fast open and close devices 18 and 19. As shown by the detail of FIG. 3, snap-fit lugs 18 are fashioned in the covers 1*a* and 2*a* of each housing and will engage in the corresponding grooves 19 provided for this purpose in the bottoms 1*b* and 2*b* of said housings 1 and 2.

Said first housing 1 in accordance with standard MIL-STT4150, is intended to contain the visual locating unit A, the second housing 2, in accordance with standard MIL-STT4150, enclosing the beaconing unit B.

The two housings 1 and 2 are clad with a cellular padding 4*a*, 4'*a*, 4*b* and 4*c* respectively fashioning compartments 5*a*, 5*b*, 5*c*, 5*d*, 5*e*, 5*f*, 5*g*, 5*h*, 5*i*, 5*j*, 5*k*, 5*l*, 5*m*, 5*n*, 5*o*, 5*p* forming a certain number of cells in the housings 1 and 2, and intended to contain, to retain in a reliable manner and to extract in a rapid manner the various elements constituting the visual locating unit A and the beaconing unit B. As shown by FIGS. 3 and 4, the second housing 2 in fact comprises two padding stages intended to be superimposed one on the other.

The first housing 1 once closed and containing the visual locating unit A will have a weight not exceeding 10 kilograms and its bulk will be sufficiently reduced to be able to be carried easily in a single hand by a single person with the aid of the carrying handle 6*a*. Likewise, the second housing 2 furnished with the various elements constituting the beaconing unit B will have a weight not exceeding 20 kilograms and its bulk will likewise allow it to be lifted with a single hand by a single person by virtue of the carrying handle 6*b*.

The first housing 1 is intended to receive the elements constituting the visual locating unit A which will be able to be perceived by the pilot, having to touch down on the chosen surface or area H, from a distance of greater than 40 km at night.

As shown by FIGS. 2 and 5, the first housing 1 or briefcase 1 encloses a light with four successive white flashes 7, of very high power, linked to a high frequency current generator box 8 supplied by a module of lithium electric batteries 9 of twelve volts and of thirty-five amperes. These three elements are linked by electric wiring 10 coupled to an on/off switch 36 and couplings for fast electrical connection of the CANON coupling type 11.

The light with four successive white flashes 7 consists of a flash lamp (not represented) mounted in a leaktight transparent Plexiglas globe 13 which comprises facets scattering light in all azimuths according to the principle of the Fresnel lens. The light with four successive white flashes 7 is fixed to a mechanical sucker 14.

Once removed from the housing 1, said sucker 14 supporting the light with four successive white flashes 7 is intended to be mounted on the cover 1*a* of the first housing 1. The mounting of the sucker on the cover 1*a* of the first housing 1 is done simply by placing the sucker thereon and then swinging the lever 15 which fastens the sucker to the cover 1*a* by suction, see FIGS. 1 and 5.

The light with four successive white flashes 7 represented in FIGS. 1, 2 and 5, generates groups of at least four successive closely spaced flashes and is intended to catch the eye of a pilot of an aircraft in flight and in particular a helicopter transporting said airborne and in particular heliborne team or teams, from a distance of more than forty kilometers, at night, so as to direct it to the chosen touchdown surface or area H for the intervention. This light will attract attention even if it is placed in an illuminated urban environment.

This first visual locating unit A furnished with the module of lithium electric batteries 9, of twelve volts and of thirty-five amperes, runs autonomously for more than twelve hours of operation. As a variant, the pocket 5*m* provided in the cellular padding 4*a* of the bottom 1*b* of the first housing 1 may receive a second module, identical to the first, for backup energy, not represented.

Said module of lithium electric batteries 9 supplies DC electric current with a voltage of twelve volts to an electronic box 8. Said electronic box 8 transforms said DC current into high frequency current and discharges it into the light with four successive white flashes 7 in groups of at least four successive flashes.

In the course of the use of said first housing 1, the cover 1*a* on which said light with four successive white flashes 7 rests is preferably reclosed as shown by FIG. 1*a* to protect the electronic elements 8 and 9 that it contains from the weather.

This first housing 1 containing the visual locating unit A is intended to be set up at least a hundred meters upstream of the chosen touchdown surface or area H so as not to impede the pilot of an aircraft and in particular of a helicopter transporting said airborne and in particular heliborne team or teams, in the last phase of the landing as shown by FIG. 9.

Said first housing 1 with its visual locating unit A unfurled is intentionally separated from the beaconing unit B and therefore from the second housing 2 so as to be able to be set up for example on the crest of a plateau while the rescue takes place at the bottom of a valley. This allows the pilot of an aircraft and in particular of a helicopter transporting said airborne and in particular heliborne team or teams, to approach the rescue site while overflying the plateau heading for the light with four successive white flashes 7 and to discover said chosen touchdown surface or area H duly beaconed in the valley after passing vertically above said light with four successive white flashes 7.

As shown by FIGS. 3 and 4, the second so-called beaconing unit B for said touchdown surface or area H chosen for the intervention of said airborne and in particular heliborne teams, is accommodated in the second housing 2. For this purpose, said second housing 2 comprises two cellular padding stages 4*b* and 4*c*. The upper stage 4*b* supports the windsock 17 intended to rest in its pocket 5*o* between the cover 2*a* and the upper stage of the padding 4*b* of the bottom 2*b* of the second housing 2. The lamp of the windsock 47 is accommodated in the pocket 5*i* of the padding 4*b* provided for this purpose. In this cellular padding 4*b* are also accommodated in compartmentalization cells, hereinafter dubbed cells or pockets, provided for this purpose, the remote control 34 for the beacons 16*a* to 16*e*, the stainless steel spike 42 for fixing the mast of the windsock 17 to the ground, the front lamp 40 of the operator on the ground x, the portable GPS receiver box 41 as well as a second means of GPS charting (not represented) of the precise geographical coordinates of said chosen touchdown surface or area which will be transmitted by radio or by telephone to said airborne and in particular heliborne teams.

In the present case, the five luminous beacons 16*a* to 16*e* accommodated respectively in the cells 5*a*, 5*b*, 5*c*, 5*d*, 5*e* of the lower stage 4*c* of the bottom 2*b* of the second housing 2 have been represented. In this lower cellular padding 4*c* are also accommodated the sucker 46, the tubes 44 and 45 constituting the mast 43 for fixing the windsock 17.

The five beacons 16*a* to 16*e* contained in said second unit 2 termed beaconing unit B and represented in FIGS. 6 and 7 have been designed and tailored in accordance with the present invention so as to comply with the demands set forth in the introduction of the present patent application.

Said beacons 16*a* to 16*e* are of a weight and of a shape which allows them to remain in position on the ground so as not to be moved by the blast from an aircraft and in particular from a helicopter which overflies them at ground level.

Accordingly, they must be manufactured with high precision whilst being leaktight against rain, mud and projections of dust caused by aircraft and in particular helicopters.

As shown by FIGS. 6 and 7, the body 20 of each beacon is made of polished chrome-plated aluminum. This body 20 is at least one hundred and five millimeters high, thereby making it possible to clear the illuminating zone situated at the top of said body of any ground foliage or other natural ground obstacles on the chosen touchdown surface or area to be beaconed.

This body 20 supports an electronic board 21 on which is printed an electronic circuit on which are disposed and supplied with electrical energy fifty-four LED diodes 22 and 24 directed upward, and twelve LED diodes 23 directed downward.

In accordance with the invention said LED diodes 22, 23 and 24 are designed so as to obtain a light termed "cold light" generating a light of high intensity while benefiting from extremely reduced consumption, thereby allowing each beacon to ensure a light of more than twelve hours at full power with the aid of ten new plaice. The mean lifetime of said diodes is therefore more than two hundred thousand hours of operation, thus making it possible to obtain, by virtue of this technology, a lighting source whose reliability is unique at the present time.

As a variant, the LED diodes 22, 23 and 24 could be provided so as to emit infrared rays that are invisible to the naked eye so as to cater for military applications.

In accordance with the invention said diodes 22 directed upward emit a white color light and are situated around and outside the chrome-plated optical cone 25 which returns said vertical light at an angle alpha α lying between zero degrees starting from the horizontal plane up to thirty-five degrees near the top, see FIG. 6. This said optical cone 25 envelopes all the upward-directed LED diodes 22 which emit white light so as to perceive only blue light on passing vertically above said beacon.

Said upward-directed LED diodes 22 comprise forty-eight white diodes 22 and six blue diodes 24 which emit a blue color light and which are situated inside the central orifice 27 of the optical cone 25. These blue diodes 24 emit blue light directed at an angle Beta β of thirty-five degrees oriented about the vertical axis of the beacon.

Said optical cone 25 mounted on the board 21 is designed in such a way as to return the light and, accordingly, is made of chrome-plated stainless steel whose faces 26 are polished. The central orifice 27 of said optical cone 25 allows vertical passage of the beam of blue light emitted by the six blue diodes 24 situated within the core of said orifice 27.

Said board 21 is enveloped by a leaktight protective dome 28 made of Plexiglas four millimeters thick protecting all the constituent elements of the beacons 16a to 16e against projections from rain, dust and mud caused by the blast from any type of aircraft and in particular of helicopter.

A small distance away from the exterior periphery of the board 21 are mounted, in appropriate drillings 29, equidistant from one another, twelve LED diodes 23 of white color directed downward.

The white light emitted downward by said twelve LED diodes 23 is reflected on the bottom part of the conical body 20 provided for this purpose and polished in such a way as to return said light to the ground around said beacon as shown by the arrow F so as to create a halo of light on the ground giving the pilot of the aircraft and in particular of the helicopter transporting said airborne and in particular heliborne team or teams, a horizontal plane effect consisting of the five white halos on the ground generated by said five beacons 16a to 16e installed on the ground.

The bottom of said beacons 16a to 16e is furnished with a leaktight cover 30 for fast opening, by virtue of a broken thread (not represented) which makes it possible to open this cover with a simple quarter turn, unscrewing it in order to change the electric batteries. This cover 30 supports the box 31 of ten standard AA LR6 type plaice. The choice of electric batteries of this type is dictated by a safety imperative and allows the rescue teams implementing the present invention to easily find spare electric batteries, on the market.

The hollow body 32 of said beacons 16a to 16e also encloses a box 33 for receiving the radio transmissions of the remote control 34.

Said remote control 34 allows said at least one person intervening on the ground x who installs the beaconing unit B in accordance with the invention to remotely turn on or turn off said beacons 16a to 16e; it also makes it possible after turning on, to go from one lighting level to another with each short press of the control button 35, it also makes it possible to remotely turn on or off the light with four successive white flashes 7 of the visual locating unit A.

After turning on, said five beacons 16a to 16e are in the position of weakest light which allows an approach with the aid of night vision goggles on a dark night. This lighting position is called level 1.

A short press of the button 35 of the remote control 34 increases the light level of said beacons 16a to 16e so as to allow an approach under night vision goggles on a brighter night. This lighting position is called level 2.

Another short press of the button 35 of the remote control 34 increases the light level of said beacons 16a to 16e so as to allow an approach under night vision goggles on a very bright night with a full moon. This lighting position is called level 3.

Finally, another short press of the button 35 of the remote control 34 increases the light level of said beacons 16a to 16e to the strongest level so as to allow an approach with the naked eye at night without any night vision equipment. This lighting position is called level 4.

Another short press of the button 35 of the remote control 34 restores the lighting level to the position called level 1 and so on and so forth with each short press.

The reception box 33 of the beacons 16a to 16e also allows the remote control of the simultaneous turning on or off of the five beacons 16a to 16e.

In the off position, a single depression, however short, of the button 35 causes a transmission of the remote control 35 which instructs the instantaneous and simultaneous turning on of said five beacons 16a to 16e while in the on position, a depression of more than three seconds of the button 35 causes a transmission of more than three seconds of the remote control 34 which instructs the simultaneous turning off of said five beacons 16a to 16e.

This instruction timescale of more than three seconds for turn off has been imposed for safety reasons so as to avoid any untimely turning off when adjusting the various levels of lighting power of said beacons 16a to 16e when an aircraft and in particular a helicopter is in the approach phase to said device unfurled and deployed.

In accordance with the method of the invention, said at least one person intervening on the ground x furnished with the device contained in the two housings 1 and 2 as described hereinabove, after having chosen any touchdown surface or area H, will be able to make contact with one or more airborne and in particular heliborne teams, tasked with meeting up with him with a view to allowing in particular the rescue operations envisaged.

Accordingly said at least one person intervening on the ground x will have to locate and beacon said chosen touchdown surface or area H so as to allow the landing of at least one aircraft and in particular one helicopter transporting said airborne and in particular heliborne team or teams.

The two leaktight housings 1 and 2 being able to be carried by a single person, said at least one person intervening on the ground x will easily be able to carry all the elements contained in them to said chosen touchdown surface or area.

Once having reached the site, the first unit contained in the first housing 1 will be set up some one hundred meters upstream of said chosen touchdown surface or area H so as not to impede the pilot of an aircraft and in particular a helicopter transporting said airborne and in particular heliborne team or teams, in its last phase of landing as shown by FIG. 9.

After opening of this first housing 1, the light with four successive white flashes 7 will be very rapidly mounted on the cover 1a of said housing with the aid of the mechanical sucker 14. As was indicated previously, the mounting of this sucker 14 on the top of the first housing 1 is done very simply by placing said sucker on the cover 1*a* of the first housing 1 then swinging the lever 15 which fastens the sucker 14 to the latter by suction.

This operation being carried out and the control button 36 of the light with four successive white flashes 7 being turned on, the first housing 1 can be reclosed to protect the electronic elements which it contains and in particular the module of lithium electric batteries 9 supplying the electronic box 8 transforming the DC current into high frequency current so as to discharge it to the light with four successive white flashes 7.

It was specified previously that this light with four successive white flashes 7 attracts attention even if it is placed in an illuminated urban environment, its light being scattered in all azimuths in groups of four closely spaced successive flashes so as to catch the eye of the pilot of an aircraft and in particular a helicopter transporting said airborne and in particular heliborne team or teams.

After setting up of the first so-called visual locating unit A, said at least one person intervening on the ground x will very rapidly and very easily remove the elements constituting the second unit 2 termed the beaconing unit B.

Accordingly, the five beacons 16*a* to 16*e* will be disposed downstream of the chosen touchdown surface or area H as shown by FIG. 9. In fact, the first three beacons 16*a*, 16*b*, 16*c* will be aligned while being respectively separated by a distance of 25 meters, the beacons 16*d* and 16*e* deviating from the line formed by the beacons 16*a*, 16*b*, 16*c* by a distance of 25 meters so forming a Y depicted dashed in FIG. 9.

This disposition ensures the beaconing of said chosen touchdown surface or area H and allows at least one pilot of an aircraft and in particular a helicopter transporting said airborne and in particular heliborne team or teams, to approach five white points which become blue when his aircraft and in particular his helicopter passes vertically above this Y, this change of color of said Y from white to blue confirming to the pilot of the aircraft and in particular the helicopter, transporting said airborne and in particular heliborne team or teams, that he is indeed above said chosen touchdown surface or area H which was prepared for him by said at least one person intervening on the ground x without any risk of confusion with other surrounding sources of light. This identification being particularly valuable in an illuminated urban environment. This disposition also allows said pilot to immediately determine, during his vertical passage, the axis and the direction of approach of safety that were previously defined by said at least one person intervening on the ground x after the latter has assured himself of the absence of surrounding obstacles and has taken account of the wind information regarding the chosen touchdown surface or area H, these two operations necessarily being performed before the setting up of said device.

As was described previously, said at least one person intervening on the ground x turns said beacons 16*a* to 16*e* on or off remotely by way of the remote control 34 which, as was indicated previously, makes it possible to go from one lighting level to another according to the presses applied to the control button 35, thus varying the light according to the conditions under which the intervention is conducted so as to obtain either level 1, or level 2, or level 3 or level 4 indicated hereinabove.

Upon the opening of the second housing 2, said at least one person intervening at night on the ground x equips himself firstly with the front lamp 40 so as to benefit from comfortable lighting of his gestures while having his hands free and then takes out the windsock 17 and the tubes of the kit 44 and 45 accommodated in the pocket 5*g* of the cellular padding 4*c* of the second housing 2 and the stainless steel fixing spike 42 accommodated in the upper cellular padding 4*b* of said housing. The tubes 44 and 45 intended to constitute the mast 43 of said windsock 17 are made of stainless steel and carbon fiber so as to resist the blast from an aircraft and in particular a helicopter without any risk of being blown away and of going, for example, into the blades of the machine. Once mounted, the mast 43 hoists the illuminated windsock 17 to four meters above the ground although all these constituent elements fit into the small volume of the second housing 2. These tubes 44 and 45 are easily engaged by said at least one person intervening on the ground x as shown by the detail of FIG. 8*a* and the mast 43 may be fixed with the aid of the stainless steel spike 42 intended to be driven into the ground in case of absence of any vehicle on said chosen touchdown surface or area H for a mountain rescue for example. As a variant, said mast 43 could also be fixed on the roof of a vehicle by virtue of the sucker 46.

It then suffices to illuminate said windsock 17 with the aid of the leaktight autonomous lamp 47 which ensures it autonomous lighting operation for more than twelve hours of white light termed "cold light". The presence of said illuminated windsock 17, four meters above the ground, makes it possible to give the pilot of said aircraft, when passing vertically above, an accurate idea of the wind over said chosen touchdown surface or area H duly located and beaconed so that the aircraft and in particular the helicopter guided to the site does not touch down with its back to the wind when the latter is strong thus making it possible to prevent the risks of stalling called VORTEX.

Thus implemented, the method in accordance with the invention therefore allows in particular rapid and safe intervention, at night or in bad weather, of one or more airborne and in particular heliborne teams, allowing them to head toward a chosen touchdown surface or area H duly located and beaconed by said at least one person intervening on the ground x furnished with the device in accordance with the invention whose rapid setup allows safe guidance and reliable landing of said airborne and in particular heliborne team or teams, on said chosen touchdown surface or area H provided for this purpose.

As may be noted, the device described above makes it possible to solve the problems set forth in the introduction of the present patent application in particular as regards a rescue intervention where each minute gained is decisive for the survival of the injured.

In this particular case of application of the invention, provision may be made, in order to supply emergency aid as quickly as possible, for the second housing 2 to enclose a GPS guide giving in alphabetical order the GPS coordinates of the region concerned.

This guide makes it possible to transmit to the pilot of an aircraft and in particular a helicopter transporting said airborne and in particular heliborne team or teams, the accurate GPS point of the site at which the chosen touchdown surface or area H for intervention is situated. The geographical coordinates, accurate to within a few meters only, of said chosen touchdown surface or area H may also be easily charted by virtue of the portable GPS contained in the second housing 2 and transmitted to the pilot of an aircraft and in particular a helicopter transporting said airborne and in particular heliborne team or teams, even before he has taken off from his base. The pilot of an aircraft and in particular a helicopter transporting said airborne and in particular heliborne team or teams, inserts said data into his onboard GPS and can follow, right from takeoff, the shortest straight line route between his departure point and said chosen touchdown surface or area.

One is thus assured that the shortest route, in terms of distance and flight time, is accurately followed when providing emergency aid.

The invention is not limited to the embodiments described hereinabove in detail, but various modifications may be made thereto without departing from the scope thereof. In particular, the method of intervention is not limited to the emergency aid operations and its field of application may be extended to many other airborne and in particular heliborne interventions.

Moreover, the visible luminous change from the aircraft may be, in addition to a change of color, going for example from white to green or from red to blue, but also or alternatively a change of luminous shape by formation of a light beam with vertical axis inscribed within a square, a rectangle or any other specific form. Such a shape may be realized with the aid of a cone having internal faces 26 forming, in cross section, a rectangle or a square or any other specific noncircular shape.

The invention claimed is:

1. A method for locating and beaconing any chosen touchdown surface or area (H) for an intervention at night or in bad weather of at least one airborne team carrying out one or more rescue operations, cooperating with at least one person intervening on the ground (x) positioned on said chosen touchdown surface or area (H), so as to allow the fast and safe landing or takeoff of of aircraft including helicopters, transporting airborne team or teams, characterized in that it allows said airborne team, after deployment, setup and lighting of an item of hardware by said at least one person intervening on the ground (x), to pinpoint locate, approach and overfly any chosen touchdown surface or area (H), by visual location and beaconing formed of at least five independent and energy-autonomous beacons, so as to cause a visible luminous change from the aircraft with the aid of the beaconing which emits skyward a substantially horizontal beam of light of a first color and a central beam of vertically concentrated a light of different color, only the central beam being perceived by the passage of the aircraft vertically above this beaconing, so as to land to take off again in almost complete reliability on the touchdown area.

2. The method of intervention as claimed in claim 1, in which said at least one person intervening on the ground (x), after having chosen said touchdown surface or area with a view to the intervention and charted its precise geographical coordinates by virtue of a GPS receiver (41) makes contact by any means of communication with said airborne team or teams, so as to immediately transmit the precise geographical coordinates of said chosen touchdown surface or area (H) to be located and to be beaconed with a view to ensuring their intervention, at night or in bad weather, thereon so as to allow said intervention in the shortest timeframe.

3. The method as claimed in claim 2, in which said at least one person intervening on the ground (x) ensures the easy carriage of the hardware on said chosen touchdown surface or area (H) in such a way as to set up, on the latter, a first visual locating unit (A) and a second beaconing unit (B) for the purposes of ensuring visual location of said chosen touchdown surface or area (H) thus allowing a safe approach and a reliable landing of aircraft including helicopters, transporting said airborne team or teams.

4. The method as claimed claim 1, in which the pilot of an aircraft transporting said airborne team or teams, arriving vertically above the chosen touchdown surface or area (H), is presented with a change of the color generated by the beaconing unit disposed in the shape of a Y (16a to 16e), from white to blue, to allow confirmation by said pilot that his aircraft is indeed above said chosen touchdown surface or area (H) and also allowing confirmation during vertical movement of a safe axis and direction of approach, said safe axis and direction of approach having previously been defined by said at least one person intervening on the ground (x) after the latter has assured himself of the absence of surrounding obstacles and has taken account of the wind information for the chosen touchdown surface or area (H).

5. An intervention device for the implementation of the method as claimed in claim 1, characterized in that it comprises two leaktight housings (1, 2), that can be easily carried by said at least one person intervening on the ground (x) and are intended to be disposed on said chosen touchdown surface or area (H), the interior volume of said housings (1, 2) being intended to accommodate, retain and allow the extraction with almost complete reliability of the hardware constituting said device necessary for said intervention with a view to its fast and effective mounting, said hardware comprising two units disposed respectively in each of said housings (1, 2), namely:

a first visual locating unit (A), for said chosen touchdown surface or area (H) comprising at least one lamp capable of providing successive white flashes (7), linked to a high frequency current generator box (8), said first unit being, after setup, visible in flight from a distance of greater than forty kilometers by the pilot of the aircraft transporting said airborne intervention team or teams, a second beaconing unit (B), for said chosen touchdown surface or area (H) for said airborne team or teams, comprising at least five independent luminous beacons (16a to 16e) that are autonomous in terms of electrical energy and are furnished with a set of optical cones (25) possessing a central orifice (27) for emitting a light oriented about the vertical axis of each beacon and faces (26) for emitting a light departing from the horizontal plane and at the angle (α) formed by these faces (26), and which are intended to generate at least five luminous points fixed on the ground after their setup, and elements of a kit (42, 43, 44, 45 and 46) allowing instantaneous mounting of a complete windsock (17) and of its autonomous lighting system (47), said second unit ensuring, after setup, a beaconing of said chosen touchdown surface or area (H), compatible with any difficult vision system including night vision goggles.

6. The intervention device as claimed in claim 5, in which said at least one person intervening on the ground (x) can ensure the visual locating of said chosen touchdown surface or area (H) with the aid of the hardware comprising a lamp having an on/off button and capable of providing successive white flashes (7) of very high power and having a mechanical sucker (14) for attaching said lamp onto the cover (1a) of said first housing (1) of the device, a module of lithium electric batteries (9) linked to the high frequency current generator box (8) in such a way as to allow the aircraft pilot transporting said airborne team or teams, to visually locate, in flight, the intervention site from a distance of greater than forty kilometers at night.

7. The intervention device as claimed in claim 6, in which said at least one person intervening on the ground (x) can ensure the beaconing of said chosen touchdown surface or area (H) by disposing at least five said beaconing units (16a to 16e) that are autonomous in terms of electrical energy, rainproof, and dustproof in such a way as to generate at least five fixed luminous points in the configuration of a Y on the ground, said beaconing units (16a to 16e) generating cold light able to be used by the pilot of an approaching aircraft transporting said airborne team or teams, either with the naked eye, night vision goggles, or using infrared radiation.

8. The intervention device as claimed in claim 7, in which said at least one person intervening on the ground (x) can modify, by simple presses exerted either on a control button (35) of a remote control (34) provided for this purpose, or on a manual control button (37) situated on the body of each of the beaconing units, the lighting power levels of said beaconing units (16a to 16e) to accommodate the night vision equipment of the pilot of an approaching aircraft transporting said airborne team or teams, or as a function of the various night levels encountered during the approach.

9. The intervention device as claimed in claim 5, in which said at least one person intervening on the ground (x) can ensure the transmission to the pilot of the aircraft transporting the airborne team or teams the information pertaining to the wind by very rapidly mounting cylindrical sections or tubes (44, 45) of a collapsible mast (43) surmounted by a windsock (17) supporting at its center an autonomous lighting system (47), the fixing of said mast (43) being obtained with the aid of a stainless steel spike (42) capable of being driven into the ground or with the aid of a sucker (46) applied to a support.

10. The intervention device as claimed in claim 5, in which said leaktight housings (1, 2) take the form of housings or briefcases made of polypropylene copolymer resin and are equipped with snap-fit fast open and close devices (18, 19) and with depressurization valves (3a, 3b).

11. The intervention device as claimed in claim 10, in which the weight of the first housing (1) does not exceed ten kilograms and its bulk is reduced so as to be able to be transported with the aid of a carrying handle (6a) by a single person.

12. The intervention device as claimed in claim 11, in which the interior of said first housing (1) is clad with a cellular padding (4a) having a bottom (1b) in which are fashioned compartmentalization cells making it possible to accommodate and retain in a reliable manner and to rapidly withdraw the hardware constituting said first visual locating unit (A).

13. The intervention device as claimed in claim 5, in which said first visual locating unit (A), accommodated in said first housing (1), comprises a module of lithium electric batteries (9) of thirty-five amperes, of a high frequency current generator box (8), of a light capable of providing four successive white flashes (7) forming the flash lamp, of a system for turning on and off by remote control, of the manual on/off control button (36), of wiring and of couplings for fast electrical connection (10, 11) linking these various elements together.

14. The intervention device as claimed in claim 13, in which said light capable of providing four successive white flashes (7) comprises a mechanical sucker (14) for attachment to a support, allowing rapid attachment of said light to the top of the first housing (1) which has been reclosed after the removal of said light.

15. The device as claimed in claim 13, in which said light capable of providing four successive white flashes (7) is configured to be supplied either by the module of lithium electric batteries (9) allowing its continuous use for more than twelve hours, or by a cigar lighter socket of a ground vehicle providing electrical current of a voltage of twelve volts or of twenty-four volts, or by a second module of lithium electric batteries, identical to the first module designed for supplying backup energy to the high frequency current generator box (8).

16. The intervention device as claimed in claim 5, in which said beaconing unit (B) accommodated in said second leaktight housing (2), does not exceed a weight of twenty kilograms and its bulk is such that it can be carried in one hand by a single person, said second housing (2) being furnished with a snap-fit fast open and close device (18, 19) and with a depressurization valve (3b).

17. The intervention device as claimed in claim 16, characterized in that said second housing (2) comprises a bottom (2b) clad with a cellular padding with two stages (4b, 4c) in which are fashioned compartmentalization cells, making it possible to accommodate and retain in a reliable manner and to rapidly extract the beaconing unit (B) for said chosen touchdown surface or area (H) for the intervention of said airborne team or teams.

18. The device as claimed in claim 1, characterized in that the body of said beacons (16a to 16e) encloses a box often electric batteries (31) of standard AA or LR6 type, the shape of said body, in the lower conical part, is devised so as to return a part of the light downward in order to create a halo of light on the ground giving the pilot a horizontal plane effect and the height of said body is such that it makes it possible to fashion a lighting zone situated above the foliage or other natural obstacles on the ground.

19. The intervention device as claimed in claim 8, characterized in that it comprises a receiver box (33) for the radio transmissions of the remote control (34), inserted inside the body (20) of said beacons (16a, 16e) so as to allow said at least one person intervening on the ground (x) to remotely turn on or turn off said beacons (16a to 16e) and to modify the lighting intensity thereof, without moving and without entering the safety zone of ground deployment of the aircraft with the aid of a remote control (34) contained in said second housing (2), said receiver box (33) being able also to be controlled directly by the pilot of the guided aircraft transporting said airborne team or teams, by virtue of the radio thereof.

20. The intervention device as claimed in claim 5, characterized in that said beacons (16a to 16e) comprise light emitting diodes (22, 23, 24) the electronic circuit supporting the light emitting diodes (22, 23, 24) being designed in such a way as to be able to use the beacons (16a to 16e) either with the naked eye, with night vision goggles, or with infrared light.

21. The intervention device as claimed in claim 20, in which the light emitted by said beacons (16a to 16e) is emitted at an angle lying between zero degrees on a horizontal plane and plus thirty-five degrees in the vertical plane, this representing the angle at which an aircraft arrives from far away, and light forming a set of optical cones (25) concentrating a ray of blue light upward at an angle of thirty-five degrees about the vertical axes of said beacons (16a to 16e), thus allowing a pilot of an aircraft transporting said airborne team or teams, to approach the Y configuration of five white points which become blue when said aircraft passes vertically above said Y configuration, this change of color from white to blue allowing said pilot of the aircraft to confirm that he is indeed above said chosen touchdown surface or area (H) which has been prepared for him by said at least one person intervening on the ground (x).

22. The intervention device as claimed in claim 8, characterized in that the change of the various levels of power may be obtained either by simple presses exerted on a button (35) of the remote control (34) provided for this purpose, or by the radio of the aircraft or by manually actuating the control button (37) situated on the body of each beacon.

23. The intervention device as claimed in claim 5, characterized in that said second unit (2) is in the form of a kit containing in said second housing (2), the windsock (17) furnished with an autonomous lighting system (47) and a collapsible mast (43) allowing its fast setup so as to give the pilot of the aircraft and in particular of the helicopter transporting said airborne and in particular heliborne team or teams, the wind information item or items regarding said chosen touchdown surface or area (H).

24. The intervention device as claimed in claim 23, characterized in that said mast (43) comprises cylindrical sections or tubes made of carbon fiber (44, 45) that can be very rapidly collapsed, is resistant to blast and pitching, after mounting, said windsock (17) being more than 4 meters above the ground.

25. The intervention device as claimed in claim 23, in which said mast (43) is fixed with the aid of a stainless steel spike (42) engaged in said cylindrical section or lower tube (45) of the mast (43) and being driven into the ground.

26. The intervention device as claimed in claim 23, in which said mast (43) is configured with a sucker (16) whereby it can be fixed on a support.

27. The intervention device as claimed in claim 23, further comprising a leaktight autonomous lamp (47), fixed at its center by a support (48) and comprising a group of LED lamps for providing autonomous lighting of more than twelve hours of said windsock (17).

* * * * *